US007589924B2

(12) United States Patent
Yoshizawa

(10) Patent No.: US 7,589,924 B2
(45) Date of Patent: Sep. 15, 2009

(54) CHARACTERISTIC EVALUATION METHOD FOR MAGNETIC DISK MEDIUM

(75) Inventor: Tsuyoshi Yoshizawa, Nagano (JP)

(73) Assignee: Fuji Electric Device Technology Co., Ltd., Tokyo (JP)

(*) Notice: Subject to any disclaimer, the term of this patent is extended or adjusted under 35 U.S.C. 154(b) by 359 days.

(21) Appl. No.: 11/716,668

(22) Filed: Mar. 12, 2007

(65) Prior Publication Data

US 2008/0037153 A1    Feb. 14, 2008

(30) Foreign Application Priority Data

May 8, 2006    (JP)    ............... 2006-129516

(51) Int. Cl.
G11B 27/36    (2006.01)
(52) U.S. Cl. ...................................... 360/31
(58) Field of Classification Search .................. 360/31, 360/39, 45, 51, 53, 13, 65, 69; 708/323
See application file for complete search history.

(56) References Cited

U.S. PATENT DOCUMENTS

| | | | | |
|---|---|---|---|---|
| 4,633,340 A | * | 12/1986 | Hayakawa | .................... 360/69 |
| 5,313,338 A | * | 5/1994 | Ichikawa et al. | ............... 360/13 |
| 6,278,567 B1 | * | 8/2001 | Nagasawa | ..................... 360/51 |
| 6,292,816 B1 | * | 9/2001 | Kim | ........................... 708/323 |
| 6,532,122 B1 | * | 3/2003 | Sugawara et al. | ............. 360/46 |
| 6,741,412 B2 | * | 5/2004 | Sawaguchi et al. | ............ 360/45 |
| 6,788,481 B2 | * | 9/2004 | Fang et al. | ..................... 360/31 |
| 6,909,568 B2 | * | 6/2005 | Fukushi et al. | ................ 360/51 |
| 6,912,100 B2 | * | 6/2005 | Sawaguchi et al. | ............ 360/45 |
| 7,170,704 B2 | * | 1/2007 | DeGroat et al. | ............... 360/53 |
| 7,259,929 B2 | * | 8/2007 | Sawaguchi et al. | ............ 360/65 |
| 7,502,189 B2 | * | 3/2009 | Sawaguchi et al. | ............ 360/65 |
| 2007/0047120 A1 | * | 3/2007 | DeGroat | ...................... 360/39 |

FOREIGN PATENT DOCUMENTS

JP    10-269511    10/1998
JP    2007305174 A  * 11/2007

OTHER PUBLICATIONS

Dean Palmer et al, "Identification of Nonlinear Write Effects Using Pseudorandom Sequences," IEEE Trans. Magn., vol. 23, pp. 2377-2379, (1987).
Y. Tang and C. Tsang, "A Technique for Measuring Nonlinear Bit Shift," IEEE Trans. Magn., vol. 27, No. 6, pp. 5316-8, (1991).
Xiaodong Che, "Nonlinearty Measurements and Write Precompensation Studies for a PRML Recording channel," IEEE Trans. Magn., vol. 31, No. 6, pp. 3021-3026, (1995).

* cited by examiner

Primary Examiner—Fred Tzeng
(74) Attorney, Agent, or Firm—Rabin & Berdo, PC

(57) ABSTRACT

To measure the nonlinear distortion of a magnetic disk even at a high recording density, a nonlinear transition shift and a partial erasure are separately measured.

A periodic pattern containing dibits and isolated bits, and a periodic pattern consisting only of isolated bits, are written and read in synchronism with the rotations of the magnetic disk. The reproduced waveforms of the respective periodic patterns are frequency-analyzed in a state where the phases of the periodic patterns are in agreement, thereby to obtain odd-numbered order harmonic components. The partial erasure and the nonlinear transition shift are evaluated on the basis of the ratio between the odd-numbered order harmonic components.

12 Claims, 4 Drawing Sheets

FLOW CHART SHOWING MEASUREMENT PROCEDURE

FLOW CHART SHOWING MEASUREMENT PROCEDURE (a) y1(t)=x(t)

(b) y2(t)=−x(t−(n+1)T)

(c) y3(t)=x(t−(n+2)T)

WAVEFORMS OBTAINED BY DECOMPOSING PERIODIC PATTERN WAVEFORM IN FIG. 3 INTO THREE ISOLATED PULSES

CHARACTERISTIC EVALUATION METHOD FOR MAGNETIC DISK MEDIUM

CROSS-REFERENCE TO RELATED APPLICATION

This application claims the benefit of priority under 35 USC 119 of Japanese application number 2006-129516, filed May 8, 2006, the entire disclosure of which is incorporated herein by reference.

BACKGROUND OF THE INVENTION

1. Field of the Invention

The present invention relates to a method for evaluating the characteristics of a magnetic disk medium. More particularly, it relates to a method of quantitatively evaluating nonlinear transition shifts, partial erasures or the like nonlinear distortions of recorded signals, attributed to the fact that bits are recorded closely adjacent to one another in a high-density record medium.

2. Description of the Related Art

A technique called PRML (Partial Response Maximum Likelihood) has become the present-day mainstream for signal processing in the read channel of a magnetic disk device, instead of a conventional peak detection method. The PRML method is a scheme wherein PR equalization, in which the signal waveform from a head is equalized to a predetermined PR target by an equalizer, is combined with an ML method, in which NRZ data are reproduced from bit data sampled at a channel rate, by maximum-likelihood decoding. When the bit interval becomes narrow, interference of waveforms occurs, and bit detection becomes difficult with the peak detection method. In contrast, since the PRML method positively utilizes the waveform interference, bit detection at a higher line record density is possible. However, when the line record density becomes conspicuously high (the bit interval becomes conspicuously narrow), nonlinear distortion of the head signal increases, and bit detection in the PRML method becomes degraded. This is because the PR equalization is based on a linear superposition of signals. In the development of a high-record-density medium, therefore, it becomes important to precisely evaluate the magnitude of the nonlinear distortion.

Nonlinear distortion includes two sorts: A nonlinear transition shift and a partial erasure. If two magnetization transitions have been recorded in close proximity, the magnetization transition recorded later is influenced by a leakage magnetic field from the magnetization transition recorded before, and the position at which the former magnetization transition is formed shifts forward from its original position. This is called a "nonlinear transition shift".

In addition, if two magnetization transitions have been recorded in close proximity, the amplitude of a reproduced pulse waveform based on each of the transitions becomes smaller than the amplitude in the case where the reproduced pulses of isolated waveforms are linearly superposed. This is called "partial erasure". Partial erasure has the following two factors: One of them is ascribable to the fact that the magnetic field at a head undergoes interference on account of a demagnetic field from an adjacent bit, so the magnetization transition width of a recorded bit spreads. The other factor is ascribable to the fact that a region where magnetization is divided appears within a bit cell on account of the interaction between grains constituting the recorded layer, resulting in a decrease of the total magnetization.

Various methods have heretofore been proposed for measuring nonlinear distortion. They are classified into a time domain method and a frequency domain method. The time domain method includes a method disclosed in Dean Palmer et al., IEEE Trans. Magn., Vol. 23, pp. 2377-2379, 1987. This method is such that pseudo-random signals are recorded on a disk, the dibit response of a reproduction system is obtained by inverse convolution calculations between the input pseudo-random signals and the reproduced signal waveform thereof, and the magnitude of the nonlinear distortion is obtained from the amplitude value of an echo on a dibit response waveform attributed to a nonlinearity. The method has the advantage that all sorts of nonlinearities can be analyzed. However, it has the problems that the processing of the calculations for obtaining the dibits is complicated, and that an extreme measurement error arises when a DC offset exists in the reproduced signal waveform.

The frequency domain method includes a method called a "Harmonic Elimination method" that is disclosed by Y. Tang et al., IEEE Trans. Magn., Vol. 27, No. 6, pp. 5316-8, 1991. This method is such that a periodic pattern which contains dibits and isolated bits and in which specified odd-numbered order higher harmonic components become zero in a case where a nonlinear component is zero, and a reference pattern which contains only isolated bits, are respectively written into a disk. The reproduced signal waveforms of the patterns are frequency-analyzed to obtain the odd-numbered order higher harmonic components of the respective waveforms, and the nonlinear transition shift is evaluated in terms of the ratio between the magnitudes of the higher harmonic components. The method has the advantage that the processing is comparatively simple and easy to perform. However, it has the problem that the partial erasure and the nonlinear transition shift cannot be separated, so the nonlinear transition shift appears to become larger than its actual magnitude, under the influence of the partial erasure. Besides, the method assumes that the nonlinear transition shift is sufficiently smaller than a bit interval, and it therefore has the problem that the measurement precision of the nonlinear transition shift becomes degraded if the assumption does not hold true.

A method in which the nonlinear transition shift and the partial erasure are separately measured is disclosed by X. Che, IEEE Trans. Magn., Vol. 31, No. 6, pp. 3021-6, 1995. This method is such that the partial erasure is first obtained alone by employing a square wave signal which is not influenced by the nonlinear transition shift, while the total nonlinear distortion is obtained by the above harmonic elimination method. In addition, the nonlinear transition shift is obtained from both the obtained results. It is a method which is excellent in the point that the nonlinear distortion can be separated. For the above reason, however, it has the problem that the measurement precision of the nonlinear transition shift becomes degraded if the assumption of the nonlinear transition shift being sufficiently smaller than the bit interval does not hold true.

Another method in which the nonlinear transition shift and the partial erasure are separately measured is disclosed in Japanese publication JP-A-10-269511. This method is an improvement on the harmonic elimination method based on the fifth order harmonic. The publication discloses that a periodic pattern of 30 bits containing dibits and isolated bits is employed as a measurement pattern. The fifth order harmonic ratio between the measurement pattern and a reference pattern, which is caused to contain only isolated bits by successively changing the bit intervals of the dibits, is obtained. Partial erasure information is then obtained from the minimum value of the ratio. Further, the value of the nonlinear transition shift is obtained by employing a relational formula between the fifth order harmonic ratio and the partial erasure as well as the nonlinear transition shift. Since, however, this method necessitates means for finely adjusting the intervals of the dibits at a high precision, it is not easy to perform.

A measurement principle for the nonlinear transition shift based on the prior-art harmonic elimination method disclosed in the previously-mentioned publication by Yang et al will now be elucidated in order to supplement the embodiment of the present invention, as will be described later.

FIG. 3 shows a periodic pattern containing dibits and isolated bits, for use in the harmonic elimination method, and the reproduced signal waveform thereof. This pattern is composed of the dibits P and the succeeding isolated bits Q. Here, the term "dibit" signifies a pattern in which the magnetization transitions represents two successive bits. This pattern is represented by an NRZI (Non-Return to Zero Invert) notation, as given below. Incidentally, the "NRZI notation" is a method in which the existence of a magnetization transition is noted as "1", whereas the nonexistence or absence of a magnetization transition is noted as "0".

Consider the pattern 1100 . . . (m 0's)100 . . . (n 0's) 1100 . . . (m 0's)100 . . . (n 0's) (see FIG. 3). Here, m=6p and n=6q (where p and q denote natural numbers) hold true. The number of bits of this pattern is N=2 m+2n+6, and the period thereof is (2 m+2n+6)T (where T denotes the bit period of the dibits). It will be indicated below that, in a case where nonlinear distortion is nonexistent, the specified odd-numbered order higher harmonics of the reproduced signal waveform become zero.

As shown in FIG. 4, the pattern in FIG. 3 can be decomposed into three periodic patterns (a)-(c) of isolated bits. Accordingly, the reproduced signal waveform y(t) is expressed as follows:

$$y(t)=x(t)-x(t-(n+1)T)+x(t-(n+2)T) \quad (1)$$

Here, "x(t)" denotes the temporal waveform of the periodic pattern (a) in FIG. 4.

The frequency spectrum Y(ω) of the reproduced signal waveform is expressed as:

$$Y(\omega)=X(\omega)-X(\omega)e^{-j\omega(n+1)T}+X(\omega)e^{-j\omega(n+2)T} \quad (2)$$

Here, the fundamental frequency $\omega_0$ is expressed as:

$$\omega_0 = \frac{2\pi}{NT} = \frac{\pi}{(m+n+3)T} \quad (3)$$

The kth order harmonic component is expressed as:

$$Y(k\omega_0) = X(k\omega_0) - X(k\omega_0) \cdot e^{-jk\omega_0(n+1)T} + \quad (4)$$
$$X(k\omega_0) \cdot e^{-jk\omega_0(n+2)T}$$
$$= X(k\omega_0) - X(k\omega_0) \cdot e^{-j\frac{n+1}{m+n+3}k\pi} + X(k\omega_0) \cdot e^{-j\frac{n+2}{m+n+3}k\pi}$$

In the case of k=2p+2q+1, the kth order harmonic component becomes zero as indicated below:

$$Y(k\omega_0) = X(k\omega_0) \cdot \left(1 - e^{-j\frac{n+1}{m+n+3}k\pi} + e^{-j\frac{n+2}{m+n+3}k\pi}\right) \quad (5)$$
$$= X(k\omega_0) \cdot \left(1 - e^{-j\frac{2q+1}{6p+6q+3}(2p+2q+1)\pi} + e^{-j\frac{2q+2}{6p+6q+3}(2p+2q+1)\pi}\right)$$

-continued
$$= X(k\omega_0) \cdot \left(1 - e^{-j\frac{6q+1}{3}\pi} + e^{-j\frac{6q+2}{3}\pi}\right)$$
$$= X(k\omega_0) \cdot \left(1 - e^{-j\frac{1}{3}\pi} + e^{-j\frac{2}{3}\pi}\right) = 0$$

Here, "k" is always an odd number, and k=5 holds true in the case of p=q=1 by way of example.

Next, it will be indicated that, in the presence of a nonlinear transition shift, the value thereof can be obtained from the kth order harmonic components of the respective reproduced signal waveforms of the periodic pattern containing the dibits and the isolated bits and the periodic pattern of the isolated bits.

In the presence of a nonlinear transition shift, the temporal waveform ŷ(t) (the reproduced signal waveform of the periodic pattern containing the dibits and the isolated bits) is expressed as follows, where Δ denotes the nonlinear transition shift:

$$\hat{y}(t)=x(t)-x(t-(n+1)T+\Delta)+x(t-(n+2)T+\Delta)) \quad (6)$$

Here, since x(t+Δ)≅x(t)+Δx(t)/dt, the following is obtained:

$$\hat{y}(t) = x(t) - x(t - (n+1)T + \Delta) + x(t - (n+2)T + \Delta)) \quad (7)$$
$$= x(t) - x(t - (n+1)T) - \Delta \cdot x(t - (n+1)T)/$$
$$dt + x(t - (n+2)T)) + \Delta \cdot x(t - (n+2)T))/dt$$

Let "y(t)" denote the temporal waveform of the periodic pattern containing the dibits and the isolated bits, in the absence of a nonlinear transition shift, and an error signal e(t) is defined as follows:

$$e(t) = \hat{y}(t) - y(t) \quad (8)$$
$$= -\Delta \cdot x(t - (n+1)T)/dt + \Delta \cdot x(t - (n+2)T)/dt$$

The frequency spectrum E(ω) becomes:

$$E(\omega)=-\Delta \cdot \omega X(\omega) \cdot e^{-j\omega(n+1)T}+\Delta \cdot \omega X(\omega) \cdot e^{-j\omega(n+2)T} \quad (9)$$

The kth order harmonic component is expressed as follows:

$$E(k\omega_0) = -\Delta \cdot k\omega_0 X(k\omega_0) \cdot e^{-jk\omega_0(n+1)T} + \quad (10)$$
$$\Delta \cdot k\omega_0 X(k\omega_0) \cdot e^{-jk\omega_0(n+2)T}$$
$$= -\Delta \cdot k\omega_0 X(k\omega_0) \cdot e^{-j\frac{2p+2q+1}{(6p+6q+3)}(6q+1)\pi} +$$
$$\Delta \cdot k\omega_0 X(k\omega_0) \cdot e^{-j\frac{2p+2q+1}{(6p+6q+3)}(6q+2)T}$$
$$= -\Delta \cdot k\omega_0 X(k\omega_0) \cdot e^{-j(2q+\frac{1}{3})\pi} +$$
$$\Delta \cdot k\omega_0 X(k\omega_0) \cdot e^{-j(2q+\frac{2}{3})\pi}$$
$$= -\Delta \cdot k\omega_0 X(k\omega_0) \cdot \left(e^{-j\frac{1}{3}\pi} - e^{-j\frac{2}{3}\pi}\right)$$
$$= -\Delta \cdot k\omega_0 X(k\omega_0)$$

Here, from the following:

$$E(k\omega_0)=\hat{Y}(k\omega_0) \quad (11)$$

(where $\hat{Y}(k\omega_0)$ denotes the kth order harmonic component of the reproduced signal waveform $\hat{y}(t)$ of the periodic pattern containing the dibits and the isolated bits), the nonlinear transition shift $\Delta$ eventually becomes:

$$\Delta = \frac{|E(k_{\omega_0})|}{k_{\omega_0}|X(k_{\omega_0})|} = \frac{|\hat{Y}(k_{\omega_0})|}{k_{\omega_0}|X(k_{\omega_0})|} \quad (12)$$

In this manner, the nonlinear transition shift is evaluated as the ratio between the magnitudes of the kth order harmonic components of the respective reproduced signal waveforms of the periodic pattern containing the dibits and the isolated bits, and the periodic pattern of the isolated bits.

Next, a measurement procedure for the nonlinear transition shift based on the prior-art harmonic elimination method will be described.

The periodic pattern is assumed to have m=6, n=6, the number of bits N=30, and the bit period T. On this occasion, the fundamental frequency becomes $\omega_0=2\pi/NT$, and the higher harmonic to be eliminated becomes the fifth order harmonic.

First, the periodic pattern containing the dibits and the isolated bits (110000000100000011000001000000) is recorded on a magnetic disk at the bit period T.

Subsequently, the periodic pattern containing the dibits and the isolated bits is read, and the magnitude $|Y(5\omega_0)|$ of the fifth order harmonic component is obtained by frequency analysis.

Subsequently, the periodic pattern of the isolated bits (100000000000001000000000000000) is recorded on the magnetic disk at the bit period T.

Subsequently, the isolated-bit periodic pattern is read, and the magnitude $|X(5\omega_0)|$ of the fifth order harmonic component is obtained by frequency analysis.

In addition, the nonlinear transition shift $\Delta$ is evaluated as $\Delta=|Y(5\omega_0)|/(5\omega_0\times|X(5\omega_0)|)$.

As stated above, in the prior-art harmonic elimination method, the approximation $x(t+\Delta)\cong x(t)+\Delta x(t)/dt$ is made assuming that the nonlinear transition shift is sufficiently smaller than the bit period T. Therefore, this method has the problem that the measurement precision becomes degraded if the assumption does not hold true. Besides, this method cannot separate the partial erasure, so that the nonlinear transition shift appears to be larger than its actual magnitude in the presence of the partial erasure.

Also the method disclosed in the previously-mentioned publication by X. Che, which separately measures the partial erasure and the nonlinear transition shift, assumes that the nonlinear transition shift is sufficiently smaller than the bit period T, and it has the same problem as that of the harmonic elimination method.

SUMMARY OF THE INVENTION

An object of the present invention is to provide a method which can separately measure a nonlinear transition shift and a partial erasure in the measurement of nonlinear distortion of a magnetic disk, in which the measurement precision does not become degraded even at a high record density where the nonlinear transition shift is not negligible relative to a bit period. The method of the present invention can quantitatively evaluate the nonlinear distortion without requiring fine adjustment means for the bit interval of a periodic pattern to-be-recorded.

The invention is characterized by comprising the steps of recording a first periodic signal which contains dibits and isolated bits, into a magnetic disk in synchronism with a clock signal which is synchronous to a rotation of the magnetic disk and which is generated on the basis of a trigger signal synchronous to the rotation of the magnetic disk; sampling a read signal of the first periodic signal recorded on the magnetic disk, in accordance with a sampling clock which is synchronous to a rotation of the magnetic disk and which is generated on the basis of the trigger signal; Fourier-transforming those sampling data of the first periodic signal which have been obtained by the sampling, thereby to obtain a predetermined odd-numbered order harmonic component with respect to a fundamental frequency; recording a second periodic signal which contains only isolated bits, into the magnetic disk in synchronism with the clock signal; sampling a read signal of the second periodic signal recorded on the magnetic disk, in accordance with the sampling clock; Fourier-transforming those sampling data of the second periodic signal which have been obtained by the sampling, thereby to obtain the odd-numbered order harmonic component; and calculating a partial erasure and a nonlinear transition shift of the magnetic disk from the obtained odd-numbered order harmonic component of the first periodic signal and the obtained odd-numbered order harmonic component of the second periodic signal.

Here, it is possible to set the first periodic signal to have dibits and isolated bits with positions and periods that determined so that the predetermined odd-numbered harmonic component may become zero in the absence of a nonlinear component. The second periodic signal is a signal which has a period equal to that of the first periodic signal, and contains only the isolated bits. The positions of the isolated bits of the second periodic signal are equal to those of the isolated bits of the first periodic signal.

According to the invention, the partial erasure and the nonlinear transition shift can be separately evaluated. Further, an approximation operation in which the terms of the second and higher degrees of the nonlinear transition shift are discarded is not conducted, unlike in the prior-art harmonic elimination method, so that the measurement precision of the nonlinear transition shift is not degraded even if the nonlinear transition shift is not negligible relative to the bit period.

DESCRIPTION OF THE PREFERRED EMBODIMENT

Now, an embodiment of the present invention will be described. First, the basic principle of a measurement method for nonlinear distortion according to the invention will be elucidated below.

A periodic pattern containing dibits and isolated bits, for use in the invention, is identical to the pattern of the prior-art harmonic elimination method stated in the previously-mentioned publication by Y. Tang et al. That is, it is the periodic pattern 1100 . . . (m 0's)100 . . . (n 0's)1100 . . . (m 0's) 100 . . . (n 0's).

Here, as stated before, m=6p and n=6q (where p and q denote natural numbers) hold true, and a period is represented by (2 m+2n+6)T (where "T" denotes a bit period).

The temporal waveform of a reproduced signal in the presence of nonlinear distortion (a partial erasure and a nonlinear transition shift) can be expressed as follows:

$$y(t)=x(t)-(1-\alpha)\cdot x(t-(n+1)T)+(1-\alpha)\cdot x(t-(n+2)T+\Delta) \quad (13)$$

Figure 4:
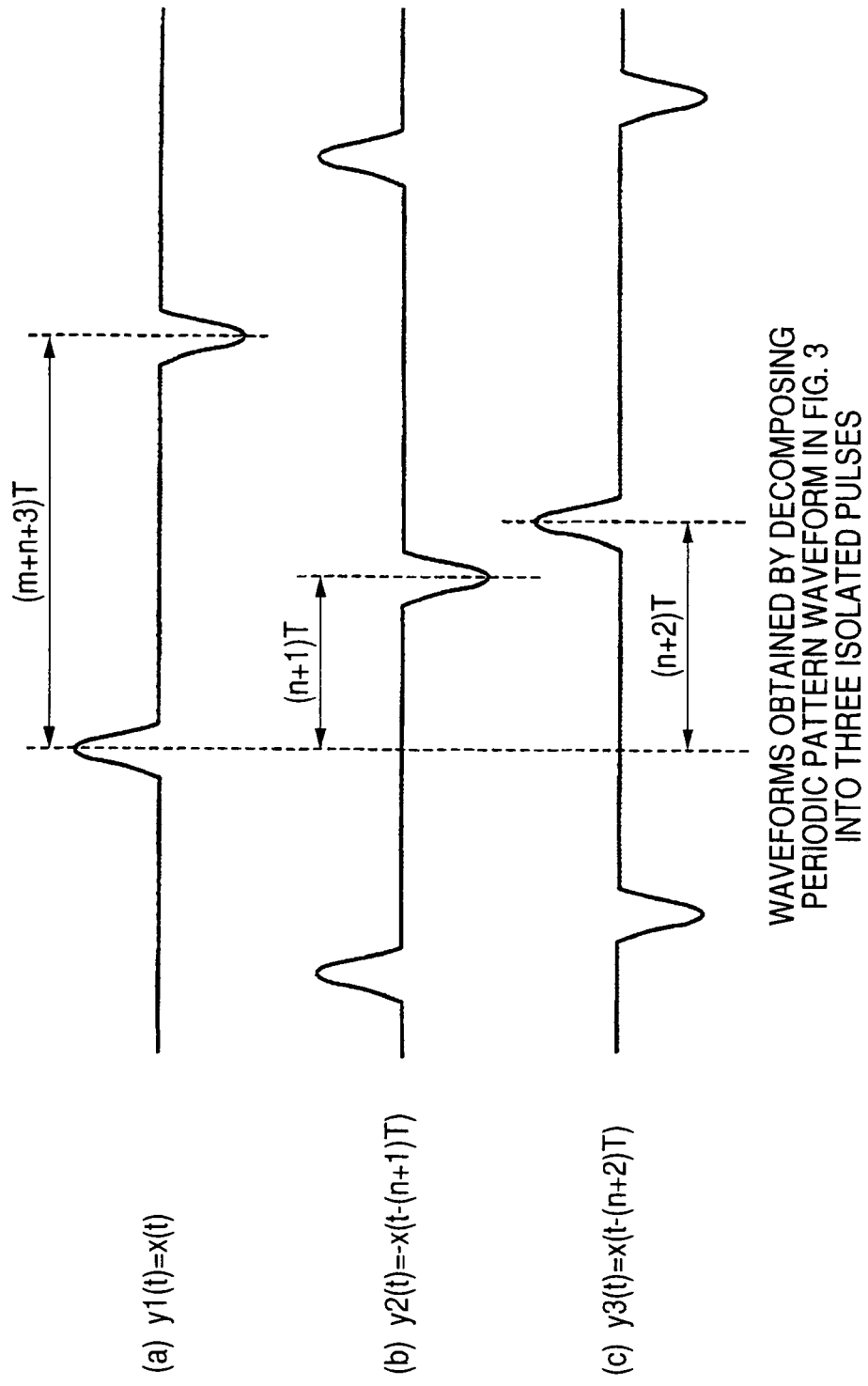
FIG. 4 is a diagram showing waveforms in which the periodic pattern waveform in FIG. 3 is decomposed into three isolated pulse sequences.

Here, "$\Delta$" denotes the nonlinear transition shift, "$\alpha$" the partial erasure, and "x(t)" the temporal waveform of the isolated pulse shown at (a) in FIG. 4.

Letting the frequency spectra of x(t) and y(t) be $X(\omega)$ and $Y(\omega)$, respectively, $$Y(\omega)=X(\omega)-(1-\alpha)X(\omega)\cdot e^{-j\omega(n+1)T}+ \\ (1-\alpha)X(\omega)\cdot e^{-j\omega(n+2)T+\Delta} \quad (14)$$

Here, the fundamental frequency $\omega_0$ is expressed as follows:

$$\omega_0 = \frac{2\pi}{NT} = \frac{\pi}{(m+n+3)T} \quad (15)$$

Accordingly, the kth order harmonic component becomes:

$$Y(k\omega_0) = X(k\omega_0) - X(k\omega_0)\cdot(1-\alpha)\cdot e^{-j\frac{2\pi k(n+1)}{N}} + \\ X(k\omega_0)\cdot(1-\alpha)\cdot e^{-j\frac{2\pi k(n+2+\Delta/T)}{N}} \quad (16)$$

Here, the following formulas hold true:

$$\frac{2\pi k(n+1)}{N} = \frac{2\pi(2p+2q+1)\cdot(6q+1)}{2m+2n+6} \quad (17) \\ = \frac{2\pi(2p+2q+1)\cdot(6q+1)}{2(6p+6q+3)} \\ = \frac{\pi}{3}$$

$$\frac{2\pi k(n+2+\Delta/T)}{N} = \frac{2\pi(2p+2q+1)\cdot(6q+2+\Delta/T)}{2m+2n+6} \quad (18) \\ = \frac{2\pi(2p+2q+1)\cdot(6q+2+\Delta/T)}{2(6p+6q+3)} \\ = \frac{\pi}{3}\left(6q+2+\frac{\Delta}{T}\right)$$

Accordingly, the following formula also holds true:

$$Y(k\omega_0) = X(k\omega_0) - X(k\omega_0)\cdot(1-\alpha)\cdot e^{-j\frac{\pi}{3}} + \quad (19) \\ X(k\omega_0)\cdot(1-\alpha)\cdot e^{-j\frac{\pi}{3}\left(6q+2+\frac{\Delta}{T}\right)} \\ = X(k\omega_0) - X(k\omega_0)\cdot(1-\alpha)\cdot e^{-j\frac{\pi}{3}} + \\ X(k\omega_0)\cdot(1-\alpha)\cdot e^{-j\frac{\pi}{3}\left(2+\frac{\Delta}{T}\right)} \\ = X(k\omega_0) - X(k\omega_0)\cdot(1-\alpha)\cdot\left(\frac{1}{2} - j\frac{\sqrt{3}}{2}\right) + \\ X(k\omega_0)\cdot(1-\alpha)\cdot\left(\cos\frac{\pi}{3}\left(2+\frac{\Delta}{T}\right) - i\cdot\sin\frac{\pi}{3}\left(2+\frac{\Delta}{T}\right)\right)$$

Here, when $$\theta_d = \frac{\pi}{3}\left(2 + \frac{\Delta}{T}\right) \quad (20)$$

is set, the following formula is obtained:

$$Y(k\omega_0)/X(k\omega_0) = 1 - (1-\alpha)\cdot\left(\frac{1}{2} - i\cdot\frac{\sqrt{3}}{2}\right) + \quad (21) \\ (1-\alpha)\cdot(\cos\theta_d - i\cdot\sin\theta_d) \\ = 1 - (1-\alpha)\cdot\left(\frac{1}{2} - \cos\theta_d\right) + j\cdot(1-\alpha)\cdot \\ \left(\frac{\sqrt{3}}{2} - \sin\theta_d\right)$$

Here, when $$Re[Y(k\omega_0)/X(k\omega_0)] \text{ and } Im[Y(k\omega_0)/X(k\omega_0)]=I \quad (22a \text{ and } 22b)$$

are set, the following formulas are obtained:

$$R = 1 - (1-\alpha)\cdot\left(\frac{1}{2} - \cos\theta_d\right) \quad (23)$$

$$I = (1-\alpha)\cdot\left(\frac{\sqrt{3}}{2} - \sin\theta_d\right) \quad (24)$$

When these formulas are solved for $\cos\theta_d$ and $\sin\theta_d$, the following formulas are obtained:

$$\cos\theta_d = \frac{2(R-1) + (1-\alpha)}{2(1-\alpha)} \quad (25)$$

$$\sin\theta_d = \frac{(1-\alpha)\sqrt{3} - 2I}{2(1-\alpha)} \quad (26)$$

$$\left[\frac{2(R-1)+(1-\alpha)}{2(1-\alpha)}\right]^2 + \left[\frac{\sqrt{3}(1-\alpha)-2I}{2(1-\alpha)}\right]^2 = 1 \quad (27)$$

Accordingly, the partial erasure $\alpha$ becomes:

$$\therefore \alpha = \frac{R^2 + I^2 - 2R + 1}{R - 1 - \sqrt{3}\cdot I} + 1 \quad (28)$$

The nonlinear shift $\Delta$ becomes:

$$\therefore \Delta = \left(\frac{3}{\pi}\theta_d - 2\right) = \frac{3}{\pi}\cos^{-1}\left(\frac{2(R-1)+(1-\alpha)}{2(1-\alpha)}\right) - 2 \quad (29)$$

In this manner, when the values of the real part and imaginary part of the ratio between the kth order harmonic spectra of the reproduced signal waveforms of the periodic pattern containing the dibits and the isolated bits and the isolated-bit periodic pattern are found, the partial erasure can be obtained by Equation (28), and the nonlinear transition shift can be obtained from the value of the partial erasure by Equation (29). However, the phases of the reproduced signal waveforms of the periodic pattern containing the dibits and the isolated bits and isolated-bit periodic pattern must be in complete agreement. Otherwise, the ratio between the respective kth order harmonic components becomes erroneous, and the partial erasure and the nonlinear transition shift cannot be evaluated precisely. In the method of the present invention, therefore, the positions of the respective isolated bits of the periodic pattern containing the dibits and the isolated bits and the isolated-bit periodic pattern are brought into agreement, and the write processing into the disk and the read processing from the disk are performed in synchronism with timing signals which are coordinated with disk rotations.

Figure 1:
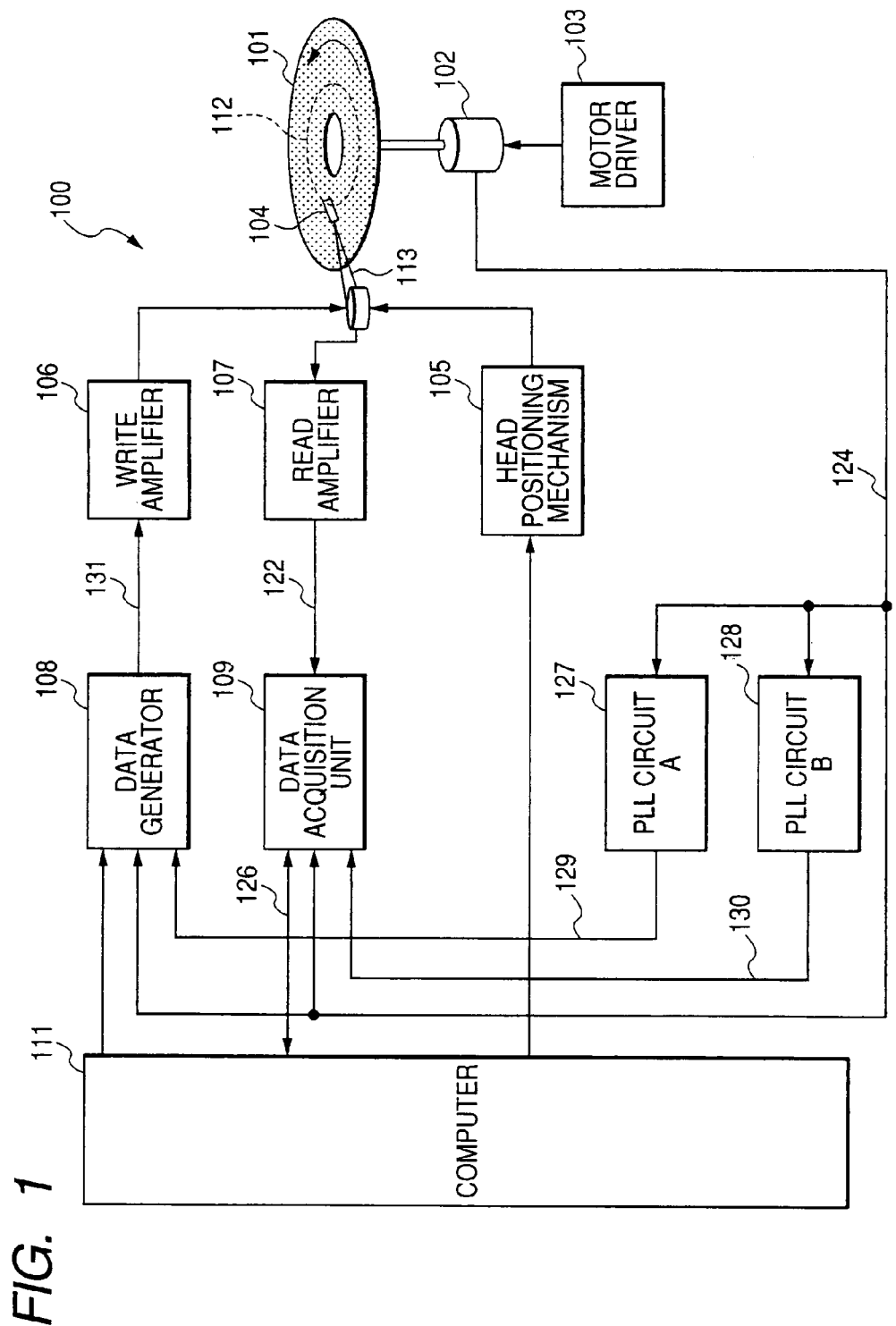
FIG. 1 is a block diagram of a read/write tester which is used for measuring nonlinear distortion according to the present invention.

Next, a practicable method for measuring nonlinear distortion in accordance with the invention will be described. FIG. 1 shows a read/write tester 100 for measuring the nonlinear distortion. A magnetic disk 101 is fixed to the rotary shaft of a spindle motor 102, and it is rotated and controlled by a motor driver 103. A head 104 is fixed to a head positioning mechanism 105 through a suspension arm 113. The head 104 is moved in the radial direction of the magnetic disk 101 while floating over the record surface of the magnetic disk 101 during rotation of the magnetic disk 101. A data generator 108 produces write data 131 corresponding to a data pattern programmed beforehand. The write data 131 are converted by a write amplifier 106 into a write current whose direction changes in accordance with the pattern, and which causes the magnetic flux of a recording element (not shown) in the head 104 to change. Thus, the data are recorded into the magnetic disk 101.

The data recorded on the magnetic disk 101 are read out by the head 104. The signal read out from the head 104 is amplified by a read amplifier 107, and a read signal 122 output from the read amplifier 107 is inputted to a data acquisition unit 109. The data acquisition unit 109 samples the read signal 122, and stores sampled data in an internal waveform memory (not shown). A digital storage oscilloscope which is commercially available can be used as the data acquisition unit 109.

A PLL circuit "A" 127 and a PLL circuit "B" 128 multiply an index pulse signal 124 of the spindle motor 102, thereby creating a write clock signal 129 and a sampling clock signal 130, respectively. Accordingly, the write clock signal 129 and the sampling clock signal 130 are synchronous. The write clock signal 129 is used as the basic clock of the data output of the data generator 108, and the sampling clock signal 130 is used as the sampling clock of the data acquisition unit 109. Here, the frequency of the sampling clock signal 130 is about 8-16 times the frequency of the write clock signal 129.

In writing the data, the write data corresponding to the programmed pattern are outputted from the data generator 108, with the index pulse signal 124 of the spindle motor 102 serving as a trigger and in synchronism with the write clock signal 129, thereby causing the programmed pattern to be written into the disk 101. On the other hand, in reading out the data, the data acquisition unit 109 samples the read signal 122, with the index pulse signal 124 serving as a trigger and in synchronism with the sampling clock signal 130. Thus, the phases of the data in the cases of writing and reading out the data can be always brought into agreement.

The read/write tester 100 is controlled by various control signals which a computer 111 generates. The control signals include, for example, a positioning control signal for the head positioning mechanism 105, and a data output control signal for the data generator 108. In addition, the sampling data of the data acquisition unit 109 are transferred to the computer 111 through a signal line 126. Besides, a program (not shown) for computing the nonlinear distortion from the sampling data is stored in the computer 111.

Next, a procedure for measuring nonlinear distortion will be described. First, as preprocessing, a peripheral track of a measurement track 112 on the magnetic disk 101 (that is, a track adjacent the measurement track 112) is AC-erased by the head 104. The AC erase is performed in such a way that a square wave signal on the order of 300-500 MHz is written into the magnetic disk 101 in correspondence with one round of the track. Here, the AC erase is performed for the reason that, when the disk is erased in a specified direction, a nonlinear distortion (hard transition shift) ascribable to the erase appears to become the error of the nonlinear distortion ascribable to the adjacency of bits as is to be actually measured.

Figure 2:
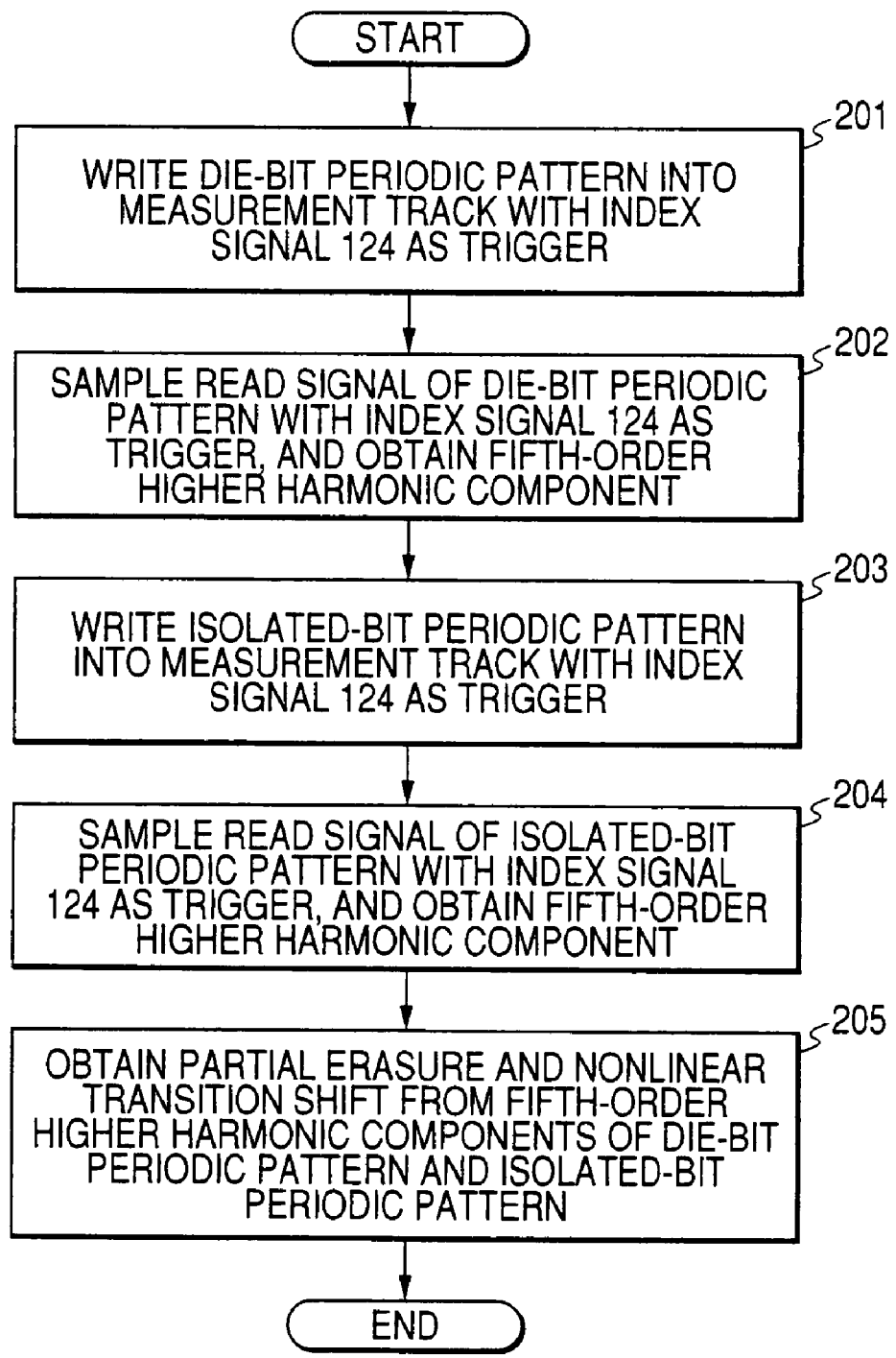
FIG. 2 is a flow chart showing a procedure for measuring nonlinear distortion according to the invention.
Figure 3:
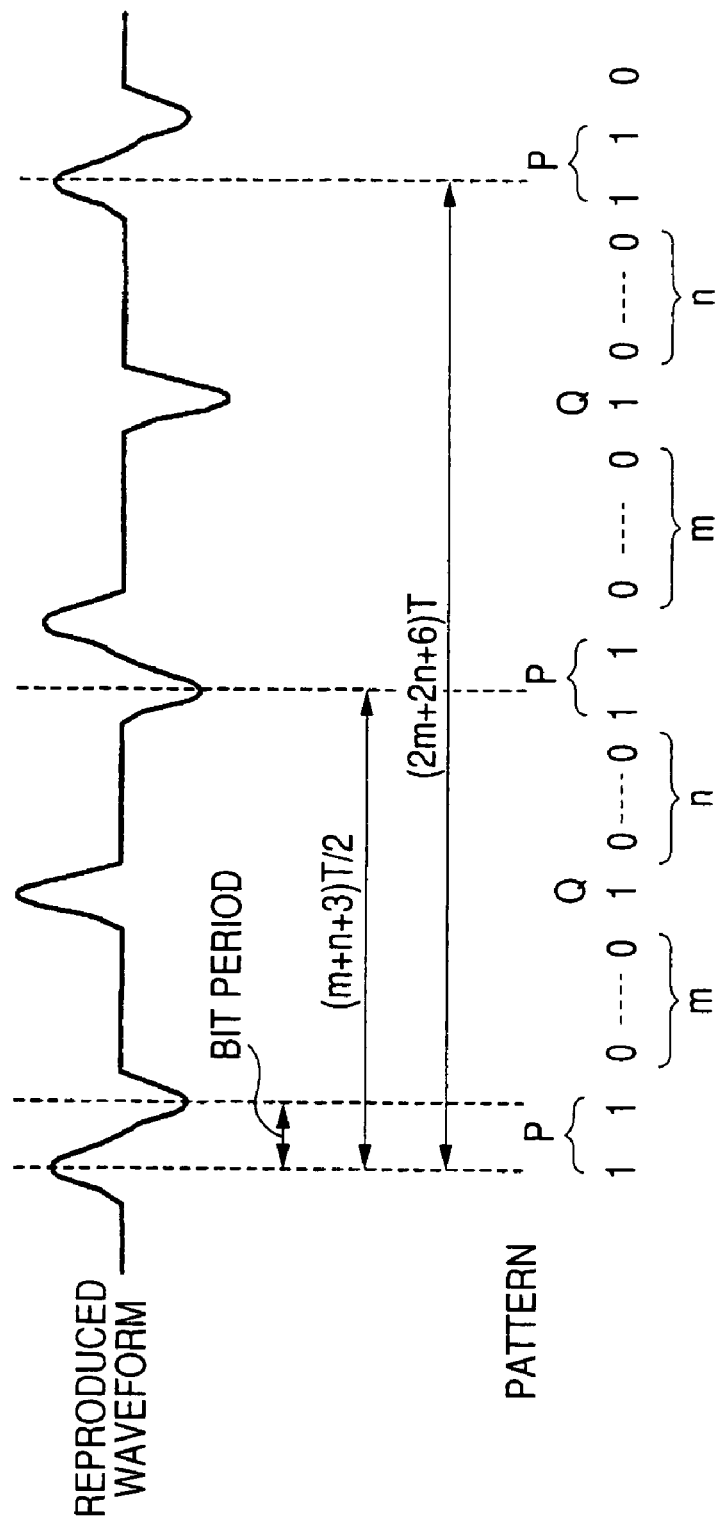
FIG. 3 is a diagram showing a periodic pattern which is used in a harmonic elimination method.

A further procedure is shown in the flow chart of FIG. 2. First, at a step 201 in FIG. 2, a periodic pattern containing dibits and isolated bits is written into the measurement track 112 on the magnetic disk 101, in synchronism with the index signal 124. In order to write the periodic pattern, the following dibit periodic pattern of 30 bits is programmed in the data generator 108 in correspondence with predetermined periods: 110000001000000110000001000000.

This pattern corresponds to a case where p=q=1 is put in the periodic pattern containing the dibits and the isolated bits as stated before, and the fifth order harmonic wave thereof becomes zero in the absence of nonlinear distortion. Here, the number of the periods or repetitions of the pattern to be programmed should preferably be large because this enhances the measurement precision. However, if the number of the periods is too large, the time required for data processing increases. Approximately 100 is suitable as the number of the periods, although this number depends also upon a bit period T.

Subsequently, the programmed write data are outputted from the data generator 108, with the index signal 124 serving as a trigger and in synchronism with the write clock signal 129. The data are written by the head 104.

Then, the periodic pattern containing the dibits and the isolated bits is read from the magnetic disk 101, and in a step 202 the read signal is sampled with the index signal 124 serving as a trigger, thereby to obtain the fifth order harmonic component. In order to perform the sampling, the periodic pattern on the disk 101 containing the dibits and the isolated bits is first read out by the head 104, and the resulting read signal 122 is sampled by the data acquisition unit 109, with the index signal 124 serving as a trigger and in synchronism with the sampling clock signal 130. In addition, the resulting sampling data are transferred to the computer 111. The computer 111 subjects the sampling data to a Fourier transform, thereby to obtain the fifth order harmonic component $Y(5\omega_0)$ of a frequency spectrum.

Here, "$\omega_0$" denotes a fundamental frequency, and it is given as $\omega_0 = 2\pi/30T = \pi/15T$. Accordingly, the fifth order harmonic becomes a component at a frequency of $\pi/3T$. Here, "T" denotes the period of the write clock signal 129.

Subsequently, at a step 203, a periodic pattern consisting only of isolated bits is written into the measurement track on the magnetic disk 101, in synchronism with the index signal 124. Before writing the periodic pattern, a track on the periphery of the measurement track 112 on the magnetic disk 101 is first AC-erased as preprocessing. In addition, the following isolated-bit periodic pattern of 30 bits is programmed in the data generator 108 in correspondence with predetermined periods: Approximately 100 is suitable as the number of the periods or repetitions as in the case of the periodic pattern containing the dibits and the isolated bits. Incidentally, those positions (the 9th bit, and 24th bit) of the isolated-bit periodic pattern at which the isolated bits appear need to agree with those of the periodic pattern containing the dibits and the isolated bits. Otherwise, a phase shift occurs, and the measurement cannot be made correctly. The isolated-bit periodic pattern that is written repeatedly is step 203 (approximately 100 times) is 00000000100000000000001000000.

The programmed write data are outputted from the data generator 108, with the index signal 124 serving as a trigger and in synchronism with the write clock signal 129, and the data are written by the head 104.

At a step 204, the read signal of the periodic pattern consisting only of the isolated bits, is sampled with the index signal 124 serving as a trigger, thereby to obtain the fifth order harmonic component. The processing at this step is similar to that of the step 202 stated above. Here, the fifth order harmonic component obtained is set as $X(5\omega_0)$.

Subsequently, at a step 205, the partial erasure and the nonlinear transition shift are evaluated from the fifth order harmonic component of the periodic pattern containing the dibits and the isolated bits, and the fifth order harmonic component of the periodic pattern consisting only of the isolated bits. In order to perform the evaluations, a ratio $Y(5\omega_0)/X(5\omega_0)$ is first obtained from the fifth order harmonic component $Y(5\omega_0)$ of the periodic pattern containing the dibits and the isolated bits, and the fifth order harmonic component $X(5\omega_0)$ of the periodic pattern consisting only of the isolated bits. In addition, the ratio is divided into a real part R and an imaginary part I. The partial erasure $\alpha$ is obtained in conformity with Equation (28). The nonlinear transition shift $\Delta$ is obtained in conformity with Equation (29). Then, the measurement of the nonlinear distortion is completed.

As described above, the partial erasure and the nonlinear transition shift can be separately evaluated with the present invention. Further, an approximation operation in which the terms of the second and higher degrees of the nonlinear transition shift are discarded is not executed, unlike in the prior-art harmonic elimination method, so that the measurement precision of the nonlinear transition shift is not degraded even if the nonlinear transition shift is not negligible relative to the bit period.

Although this embodiment has been described as to the case of using a periodic pattern which contains dibits and isolated bits and from which the fifth order harmonic wave is eliminated in the absence of a nonlinear component, a usable period pattern containing dibits and isolated bits is not restricted to the described periodic pattern. Any periodic pattern containing dibits and isolated bits may be used as long as it satisfies the conditions stated before.

Furthermore, although this embodiment has been described as to the case where the write clock in the data writing mode and the sampling clock in the data sampling mode are created from the index pulses of the spindle motor, these signals may well be created by another method. By way of example, the write clock and the sampling clock can also be created on the basis of a synchronizing signal of predetermined length that is written by the head into a specified position within the measurement track beforehand.

What is claimed is:

1. A characteristic evaluation method for a magnetic disk, comprising the steps of:
   (a) rotating the magnetic disk;
   (b) generating a write clock signal which is linked to the rotation of the magnetic disk;
   (c) recording a first periodic signal into the magnetic disk in synchronism with the write clock signal, the first periodic signal containing dibits and isolated bits;
   (d) generating a sampling clock signal which is linked to the rotation of the magnetic disk;
   (e) reading the first periodic signal from the magnetic disk to provide a first read signal;
   (f) sampling the first read signal in accordance with the sampling clock signal to provide first sampled data;
   (g) frequency-analyzing the first sampled data;
   (h) selecting, from the frequency-analyzed first sampled data, a predetermined odd-numbered order harmonic component with respect to a fundamental frequency;
   (i) recording a second signal into the magnetic disk in synchronism with the write clock signal, the second periodic signal containing only isolated bits;
   (j) reading the second periodic signal from the magnetic disk to provide a second read signal;
   (k) sampling the second read signal in accordance with the sampling clock signal to provide second sampled data;
   (l) frequency-analyzing the second sampled data;
   (m) selecting, from the frequency-analyzed second sampled data, the predetermined odd-numbered order harmonic component with respect to the fundamental frequency; and
   (n) calculating at least one of a partial erasure and a nonlinear transition shift of the magnetic disk from the predetermined odd-numbered order components selected in steps (h) and (m) from the frequency-analyzed first and second sampled data.

2. The method of claim 1, wherein step (g) comprises Fourier-transforming the first sampled date.

3. The method of claim 1, wherein step (l) comprises Fourier-transforming the second sampled data.

4. The method of claim 1, wherein the sampling clock signal has a frequency that is higher than the frequency of the write clock signal.

5. The method of claim 4, wherein the frequency of the sampling clock signal ranges from about six times higher to about eight times higher than the write clock signal.

6. The method of claim 1, wherein the first periodic signal is recorded a predetermined number of times during step (c).

7. The method of claim 6, wherein the predetermined number of times is greater than 50.

8. The method of claim 7, wherein the predetermined number of times is around a hundred.

9. The method of claim 6, wherein the second periodic signal is recorded the predetermined number of times during step (i).

10. The method of claim 1, wherein the first periodic signal is recorded in a measurement track during step (c), and further comprising the step of recording an AC erase signal on a track adjacent to the measurement track before step (c) is conducted.

11. The method of claim 1, wherein the first periodic signal has positions and periods of the dibits and the isolated bits determined so that the predetermined odd-numbered harmonic component becomes about zero in the absence of a nonlinear component.

12. The method of claim 11, wherein the second periodic signal is a signal which has a period equal to that of the first periodic signal and which contains only the isolated bits, the isolated bits of the second periodic signal having positions that are substantially equal to the positions of the isolated bits in the first periodic signal.

* * * * *